United States Patent Office 2,898,322
Patented Aug. 4, 1959

2,898,322

VULCANIZATION OF BUTADIENE RUBBERS WITH PHENOL-ALDEHYDE REACTION PRODUCTS AND PRODUCT OBTAINED THEREBY

Alvin F. Shepard, Le Roy, N.Y., assignor to Hooker Chemical Corporation, Niagara Falls, N.Y., a corporation of New York No Drawing. Application January 26, 1955
Serial No. 484,304

10 Claims. (Cl. 260—43)

The present invention relates to the vulcanization of 1,3-butadiene polymers by means of aryl hydroxide-aldehyde condensation products. More particularly, the present invention relates to a process for obtaining new and useful vulcanized materials which are the reaction products between a butadiene rubber of the aforesaid type and a new class of vulcanizing agents which are the condensation products of substituted phenols with formaldehyde. Additionally, it relates to the resulting products which possess both physical and chemical properties superior in many respects to the products resulting from the vulcanization of butadiene rubbers with the conventional vulcanizing agent, sulfur.

The term "1,3-butadiene polymer" as used above and throughout the specifications including the claims embraces within its scope polymers of 1,3-butadiene, copolymers of 1,3-butadiene, and admixtures of the two. Examples of copolymers of 1,3-butadiene include such synthetic rubbers as butadiene-styrene copolymers and butadiene-acrylonitrile copolymers referred to hereinafter as GRS and GRN rubbers, respectively.

Many attempts have been made to combine the prominent properties of the two classes of materials, the elastomers on one side and the phenolic plastics on the other, in such a way as to produce new materials of outstanding properties. These attempts have ranged all the way from a crude mixture of ground rubber as a filler in the phenolic molding compositions, or ground phenolic material as a filler in the rubber compositions, to the other extreme of forming new chamical compounds by combining representatives of the two classes chemically through a formation of primary valence bonds.

It is well known that, in the rubber industry as well as in the industry producing phenolic condensation products, the art has progressed much faster than the science, and this is even more true for the combination of these two fields, and much confusion exists regarding the interpretation of the phenomena observed when substances of these two classes are mixed or reacted with each other. The most scientific approach towards explanation of the phenomena occurring seems to be contained in two publications, one by Van der Meer, "The Vulcanization of Rubber with Phenol-Formaldehyde Derivatives," Naamlooze Vennootschop W.D., Meinema, Delft, and the other by Wildschut, Rec. trav. chim. 61, 898 (1942).

Wildschut investigated among other things the vulcanization of natural rubber by means of condensation products of p-tertiary amyl phenol with formaldehyde. He established the criteria for distinguishing between the results of intermingling the highly polymerized or condensed chains of rubber and resin molecules on one side, from a combination by means of cross-linking between them leading to a true vulcanization on the other. He offered proof of the correctness of his conceptions by investigating the solubility of mixtures of natural rubber on one side, and a paraffin "Oppanol" (polyisobutylene) one the other side, with his resins by subjecting the mixtures to the action of various solvents after heating.

Van der Meer investigated the reaction of natural rubber with the condensation products of numerous phenols with formaldehyde. He interpreted his results mostly on the basis of Wildschut's work and reached conclusions very similar to those of Wildschut.

The conclusion of these two investigators may be summarized as follows:

(1) Any mixture of a phenolic condensation product with rubber tends to increase, to a greater or lesser extent, the hardness, and tends to push it in a direction which would appear, on the surface, to approach a vulcanization.

(2) A true vulcanization, however, requires the cross-linking of the rubber hydrocarbon chains by means of the condensation products.

(3) Such cross-linking can occur only when the phenolic resins have at least two methylol groups per molecule.

(4) Not all condensation products having at least two methylol groups will vulcanize rubber.

(5) Those that do, will vulcanize rubber in a varying degree, ranging from a hardly perceptible vulcanization toward a vulcanization almost as good as that obtained with the classical rubber vulcanizing agent, sulfur.

(6) The difference in the degree of vulcanization obtained is explainable by the difference in the ratios of the rate of reaction between resin-resin on one side and resin-rubber on the other side. In other words, some resins condense with themselves, through their methylol groups, before they have an appreciable chance to react with rubber, resulting in inappreciable vulcanization. On the other end of the scale are those resins which have no tendency to condense with themselves, so that they are completely available for cross-linking the rubber molecules resulting in a high degree of vulcanization.

The scientific work of Wildschut and Van der Meer has found much attention in the rubber industry and their experiments have been repeated and extended in many industrial laboratories. The results of these experiments have not, however, led to any important industrial use, mainly because the phenols tested by them, comprising practically all of the phenols industrially available at that time, did not offer any technical or economical advantage over the customary vulcanizing agents such as sulfur and sulfur derivatives. Furthermore, the experiments referred, with the exception of a few experiments done with synthetic rubbers by Wildschut, almost exclusively to the vulcanization of natural rubber. The physical properties of natural rubber vulcanized with sulfur or sulfur derivatives are such that major improvements can hardly be expected from the use of condensation products instead of sulfur.

In accordance with the foregoing statement, if it were possible to generalize from the teaching of Wildschut and Van der Meer, who were interested in the vulcanization of natural rubber, and to apply their teaching to the vulcanization of butadiene rubbers, it would not be expected that the properties of the resultant products would in many cases be superior to the properties of a butadiene rubber vulcanized with the conventional vulcanizing agent, sulfur.

It is, however, an object of the present invention to improve the physical and chemical properties of butadiene rubbers by vulcanizing them with aryl hydroxide-foramldehyde condensation products.

A further object of the present invention is to provide a vulcanized butadiene rubber and a process for producing the same, which vulcanized product possesses physical and chemical properties superior to those obtained with the customary vulcanization agents normally employed for vulcanizing butadiene rubbers.

A further object of the present invention is to improve the physical and chemical properties of the elastomers of the butadiene rubbers by vulcanization by means of aryl hydroxide-formaldehyde condensation products, alone or in combination with the customary vulcanizing agents, over and above the range of physical and chemical properties obtainable with the customary vulcanizing agents alone.

These and other objects will become more apparent upon considering the description of the present invention as set forth hereinafter.

In accordance with the present invention, I have discovered that when certain condensation products of certain substituted phenols with formaldehyde are intimately admixed with the polymers of 1,3-butadiene and subjected to an elevated temperature, the resultant products possesses physical and chemical properties superior to those obtainable with the customary vulcanizing agents. This invention involves a number of unexpected findings:

(1) The physical and chemical properties of butadiene rubbers can be improved over and above those obtained with any of the customary vulcanizing agents, an observation which could not be expected from the facts published by Wildschut and Van der Meer who succeeded in vulcanizing natural rubber to a considerable extent, but never so far as to make the obtained products superior to those resulting from the use of sulfur as the vulcanizing agent.

(2) The few generalizations which evolved from the work of Van der Meer and Wildschut and other technical observers, as a result of work with natural rubber, were not found applicable to the vulcanization of butadiene rubbers. Both Wildschut and Van der Meer emphasized in their publications that phenols having only two active positions, the formaldehyde derivatives of which therefore cannot cure to the insoluble and infusible condition, are preferable to phenols having three active positions. The theoretical explanation given for this fact is that phenols, having only two active positions, are less liable to react with themselves instead of with the rubber than are phenols having three active positions. The latter have a great tendency to form a cross-linked network of molecules instead of, but without having connection with, the rubber. Contrary to Wildschut's and Van der Meer's teaching, for example, the dimethyl derivative of 3,5-xylenol is an excellent vulcanizing agent for GRS.

(3) Another technical observer advances a theory which is just the opposite. He recommends condensation products of phenol and formaldehyde which are hardenable to the insoluble and infusible state, for mixture with high molecular substances including natural rubber to obtain homogeneous products. However, several fallacies were discovered in this teaching. This observer taught that the suitability of condensation products as additives to high molecular substances depends mostly on the number of carbon atoms in their side chains. According to him, a minimum of 4 in certain cases, but, in general, 5 carbon atoms is required to make the resins suitable for mixing with rubber-like substances. This observation was found to be incorrect. Thus 3,4,5-trimethylphenol has only a total of 3 carbon atoms in its substituents, and yet formaldehyde derivatives of this phenol make excellent vulcanizing agents for GRS rubber, as disclosed in my co-pending application Serial No. 420,747, filed April 2, 1954, now Patent No. 2,813,843, issued November 19, 1957.

(4) This same observer advanced the theory that compatibility of resins with high molecular substances is identical with their ability to react with them, which latter ability is identical with their ability to cross-link them. He overlooked that this teaching tries to wipe out the obvious differences of three obviously distinct steps in the behaviors of two substances toward each other. Substances are compatible with each other if their chemical and physical properties are sufficiently alike. No chemical combination between them is necessary and similarity in their physical and chemical properties militates normally against a chemical combination. An example of purely physical compatibility can be found, for instance, in the mixture of petroleum oil with GRS compositions. The next step would be a chemical combination between different substances held together with one chemical main valence bond. An example of the combination of this type is, the combination of hydrogen with rubber to form a hydrogenated rubber, which is certainly a true chemical compound, but which does not produce vulcanization. Vulcanization is the third step in which one molecule of the vulcanizing agent and two molecules of the rubber combine chemically, resulting in a cross-linking of the rubber chains.

I have found a great number of exceptions to the rule laid down by this same observer. Condensation products of m-pentadecylphenol with formaldehyde are excellently compatible with GRS rubber mixtures, but fail to vulcanize them. The dimethylol compound of 3,5-xylenol, for instance, is imperfectly compatible with GRS rubber, but nevertheless gives a vulcanized GRS of high quality. This same observer further teaches that reactivity with rubber is the greater, the smaller the molecule is. This teaching too does not hold true for GRS rubber mixtures. A high molecular resin prepared from tertiary amyl phenol, having a molecular weight of approximately 1000, is a better vulcanizing agent than the corresponding dialcohol having a molecular weight of 210.

A patent of this same observer covers an almost infinite number of high molecular substances including allegedly all types of rubbers both natural and synthetic, and an infinite number of phenol-aldehyde condensation products. It is surprising, with an infinite number of combinations possible, he should not have found a single case in which true vulcanization of a butadiene rubber with a phenol-formaldehyde condensation product occurred, but actually such is the case. He investigated several rubber-phenolic condensation product mixtures and he observed the usual influence of the resin upon the physical and chemical properties of the rubber. Specifically, he observed that natural rubber, vulcanized in the presence of certain resins, gave properties superior to rubber vulcanized in the same way in the absence of such resins, but he never observed explicitly that certain resins actually do vulcanize rubber. The closest he came to making this observation was when he mixed the formaldehyde condensation product of 3-methyl-5-isopropylphenol with natural rubber, a vulcanizing agent, filler, etc., and observed that the product had a higher tensile strength than a product obtained from the same starting materials without the resin. Whether in this case he obtained true vulcanization of the natural rubber by means of this particular resin appears doubtful. Van der Meer states in his book on page 15, last line, and on page 16, lines 1 to 7, this observer "indicated that it is possible in some instances to vulcanize rubber by means of a resol but he indicated also that in these cases too, the addition of the customary vulcanizing agent such as sulfur is preferable. From his investigation it is not apparent whether or not one can speak of a chemical reaction between rubber and resol."

Specifically, in accordance with the present invention, I have discovered that 1,3-butadiene polymers may be vulcanized with a vulcanizing agent which is a resol and which is the reaction product of at least 1.2 mols of formaldehyde per mol of phenol which has the formula:

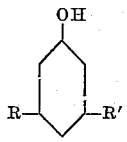

wherein R and R' are alkyl groups, and R and R' together contain collectively a total of at least 4 carbon atoms.

As will be shown hereinafter, the vulcanized materials of the present invention as produced in accordance with the process of the present invention obtain chemical and physical properties which exceed those obtainable when vulcanizing butadiene rubbers with the use of conventional vulcanizing agents.

Phenols represented by the general formula:

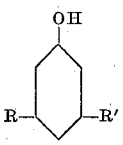

wherein R and R' are alkyl groups and contain collectively a total of at least 4 carbon atoms, and which phenols form resols when condensed with more than 1 mol of formaldehyde per mol of phenol, may be exemplified by 3,5-diethylphenol, 3-methyl-5-isopropylphenol and 3-methyl-5-sec-butylphenol.

The vulcanizing agents of the present invention are in general prepared by reacting an excess of formaldehyde with phenol, i.e., at least 1.2 mols of formaldehyde per mol of phenol, in the presence of an alkaline catalyst such as sodium hydroxide at temperatures up to the boiling point of the reaction mixture for a period of time which is selected in accordance with the particular average molecular weight desired. Specific examples presented hereinafter will illustrate time factors required for the particular temperature employed in order to obtain reaction products of suitable molecular weight. Upon completion of the reaction, the product may be dehydrated and used as such, or it may be neutralized with a weak acid such as acetic acid, washed with water to remove salts, and dried. The molecular weight, melting point and other properties of the product may be modified by heating it so as to split off either water alone or water and formaldehyde.

The above methods of producing the vulcanizing agents of the present invention may be advantageously modified in order to obtain mononuclear dialcohols. In general, the modification comprises utilizing Methyl Formcel (a 40% solution of formaldehyde in methanol). Specific details of satisfactory methods for obtaining individual mononuclear dialcohols are presented in the examples hereinafter.

The chemical significance of the method of producing these vulcanizing resins, the limitation in their composition, and their ability to vulcanize, may be explained according to the work of authors like Zinke and others [Carswell, T. S., "Phenoplasts" (pp. 20–24), Interscience Publishers, Inc., New York, 1947], by the following theory. It should be understood here that I do not want to be limited, however, by this theory, but offer it only as a possible explanation for the facts which constitute this invention.

Resins having the ability to vulcanize rubber, according to the present invention, must have, according to this theory, at least two active groups per molecule.

Active groups may be of two types. One is the methylol group such as occurs, for instance, in the dialcohol,

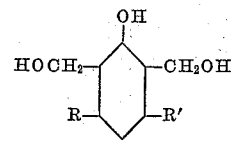

in the dinuclear compound,

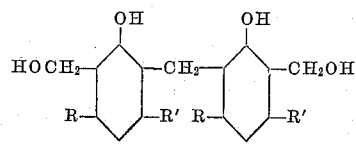

or in equivalent structures.

The second type of active group is the methylene ether group, formed by splitting off water between any two methylol groups of adjacent molecules of the compounds above.

My observations can be interpreted as indicating that during the process of vulcanization, each methylene ether group effects vulcanization to a degree equivalent to two methylol groups.

The active groups can be attached to one phenolic nucleus, as in the case of the dialcohol, or they can be attached at various points to molecules containing connected phenolic nuclei. Compounds containing less than 1.2 mols of formaldehyde per mol of phenol have either an insufficient concentration of active groups or contain the active groups at too great a distance from each other to permit an efficient vulcanization of rubber, as disclosed by the present invention.

The reaction products prepared according to this invention need not contain either methylene or methylene-ether linkages exclusively to connect the phenolic nuclei. When products are prepared commercially, without any special precautions taken to limit the structure to either one type or the other, they will generally contain linkages of both the methylene and methylene-ether types.

It has been found that satisfactory vulcanizing action is obtained only when the molecular ratio of formaldehyde to the phenol is at least 1.2 to 1. In the case of the compounds which were used to obtain the data shown in the table below, the maximum vulcanizing action was obtained with reaction products having approximately a 2:1 formaldehyde to phenol ratio, indicating a structure approaching that of either the mononuclear dialcohol, or its methylene-ether-linked condensation product. The methylene-ether-linked condensation product may be formed by one of two methods.

(1) By heating the dialcohol to produce further condensation to form a resinous material, and (2) By direct condensation of the phenol with formaldehyde, under such conditions as to be favorable for the formation of a methylene-ether-linked structure.

The data set forth were obtained with reaction products of formaldehyde and of the various phenols listed, using varying formaldehyde to phenol ratios, by employing these reaction products as curing agents for a GRS carbon black rubber comprising approximately 66 parts by weight of GRS rubber and 33 parts by weight of carbon black. In all cases 10% by weight of curing agent was intimately admixed with GRS carbon black rubber and the mixture cured under pressure for a maximum of two hours at a temperature ranging between 163° and 168° C. In some cases the dialcohol was used, while in one case a resin was prepared by heating the dialcohol.

| Condensation Product | Molecular Ratio of Formaldehyde to Phenol | Mol. Wt. | Melting Point, ° C. | Tensile Strength of Vulcanized Rubber at Optimum Cure, lbs./in.² |
| --- | --- | --- | --- | --- |
| 3,5-Diethylphenol Dialcohol | 2:1 | 210 | 88 | 3,380 |
| Resin from 3,5-Diethylphenol Dialcohol | 1.9:1 | (Indet.) | 70-75 | 3,510 |
| 3-Methyl-5-Sec-Butyl-Phenol Resin | 2:1 | 245 | 67 | 1,610 |

In general, polymers of butadiene, copolymers of butadiene and admixtures of polymers and copolymers of butadiene may be vulcanized in accordance with the present invention by intimately admixing a relatively small percentage by weight of the selected vulcanized agent of the present invention in the rubber to be vulcanized and subjecting the resultant admixture to an elevated temperature. As in the case of vulcanizing butadiene rubbers with sulfur, it is advisable to include a reinforcing type filler in order to obtain vulcanizates of high tensile strength. Among the many reinforcing fillers, carbon black made by the channel process is considered the most outstanding one. However, suitable reinforcing fillers include furnace-type carbon blacks, soft gas blacks, zinc oxide, magnesium carbonate, calcium silicate, whiting, hard clays, silica, etc.

The physical properties of polymers of butadiene, copolymers of butadiene and admixtures of the same vary from those which are relatively tough and nervy such as GRN to those which are relatively more soft and easily workable such as GRS compositions which are specifically designed for easy workability. Thus the selection of any particular butadiene rubber will dictate the degree of breakdown necessary. Temperature becomes an increasingly important factor generally as the degree of breakdown necessary increases. The conventional Banbury mixer or other rubber compounding machines are suitably equipped for controlling the temperature of breakdown.

Upon completion of the breakdown period, fillers if not previously incorporated are added as are pigments, plasticizers, anti-oxidants, etc. In general, where the temperature of breakdown is high, it may prove desirable to add the vulcanizing agents of the present invention after the addition of the other agents. Such an order of addition may serve to eliminate premature vulcanization. In conventional synthetic rubber compounding, it is the usual practice to use sulfur as the vulcanizing agent. To promote the vulcanizing action of sulfur, it is customary to add an organic accelerator such as, for example, "Santocure," which is said to be N-cyclohexyl-2-benzothiazyl-sulfenamide. An inorganic accelerator such as zinc oxide is also included. Then, to activate the zinc oxide in such a way that it will accelerate sulfur vulcanization, it is desirable to add a fatty acid such as stearic acid. Furthermore, since the synthetic rubbers do not break down readily in processing, it is difficult to incorporate the aforesaid compounding agents in the rubber, and, consequently, it is general practice to add a softener such as a hydrocarbon oil to improve processing. Finally, since sulfur vulcanizates tend to degrade under the action of heat and oxygen, age-resistors such as "BLE" are added. "BLE" is a reaction product of diphenylamine and acetone in the form of a non-volatile amber-colored liquid with a specific gravity of 1.087.

The vulcanizing agents of the present invention have a four-fold function. First, they act as plasicizing agents. In ordinary processing when sulfur is used as the vulcanizing agent, it is customary to add, in addition to the sulfur, one of the common plasticizing agents to soften up the rubber to the point where it can be easily worked. After processing, the plasicizer remains in the rubber as a foreign substance, in many cases imparting undesirable properties to the rubber. However, when the resins of the present invention are used, they act as plasticizing agents, allowing the rubber to be worked in the absence of additional plasticizing agents. Then, after they have served their purpose as plasticizing agents, they enter into the vulcanizing process, so that there are no plasticizing agents left in the finished product as foreign substances. Second, they eliminate the need for the agents described above. Third, they serve as vulcanizing agents. Finally, they serve as anti-oxidants, protecting the ultimate product from the action of heat and oxygen. The anti-oxidants and accelerators may, however, be added in the conventional manner when it is desired to enhance the specific properties over and above that degree obtainable by the use of the resin alone, but the advantage of the use of the resin is still manifested inasmuch as a smaller amount of these agents may be used when used in conjunction with the resin.

Selection of the amount of vulcanizing agent in accordance with the present invention is governed by the characteristics of the product desired as well as the selection of the particular butadiene polymer, copolymer or admixture of the same. Where it is desirable that the characteristics of the butadiene rubber predominate in the resulting product, it is advisable to employ minimum quantities of the vulcanizing agents of the present invention. For example, a composition including 2% by weight of a vulcanizing agent of the present invention when vulcanized has exceptionally good tensile strength. An increase of the percentage composition by weight of the vulcanizing agent increases the hardness and the elastic modulus while decreasing the percent elongation of the product. Increasing the phenolic resin content to, for example, 30% will obtain a product of greater hardness, greater elastic modulus, lower percent elongation, greater heat resistance and improved surface finish. From the foregoing, it will be apparent many factors govern the selection of the amount of vulcanizing agent to be incorporated in the butadiene rubber prior to vulcanization. Examples presented hereinafter will illustrate some of the variations of properties obtainable by a choice of varied amounts of vulcanizing agents.

The products of the present invention exhibit high tensile strength, in many cases almost 4,000 pounds per square inch, high elongation, and excellent solvent resistance to such solvents as benzene, toluene, carbon tetrachloride, etc. Unlike sulfur vulcanizates, they show no tendency to bloom and they are highly resistant to change in mechanical and electrical properties on heat aging.

Although the following examples employ a GRS type rubber for the purpose of demonstrating the vulcanizing ability of the vulcanizing agents of the present invention, other 1,3-butadiene polymers including polybutadiene and GRN are vulcanizable with the vulcanizing agents of the present invention and comparable results are obtained. Examples of GRN polymers include such proprietary products as Hycar and Chemigum.

*Example 1*

A reaction product of 3 methyl-5-isopropylphenol with formaldehyde was prepared from 1 mol of the phenol, 4 mols of formaldehyde (40% methanolic solution) and 1 mol KOH, the latter added slowly with cooling as a 57% aqueous solution. After standing for 24 hours at 25° C., 1.6 mols of formaldehyde had reacted. The unreacted formaldehyde was consumed by treatment with dilute sodium sulfite solution. After neutralization a crystalline solid separated. After several recrystallizations from benzene and carbon tetrachloride, the compound had a melting point of 112.5–113.5° C. An anlsis showed a carbon content of 69.30% and 69.34%, and a hydrogen content of 9.04% and 8.84%. For 2,6-dimethylol-3-isopropyl-5-methylphenol, the calculated carbon content is 68.54%; hydrogen 8.63%.

Five percent by weight of this dialcohol of 3-methyl-5-isopropylphenol was milled into GRS 1601 type rubber and cured at about 165° C. for 1½ hours. GRS 1601 type rubber is a GRS rubber master-batched with HAF Black in the proportion by weight of 50 parts HAF Black to 100 parts polymer. HAF Black is a high-abrasion furnace black. The cured rubber had a tensile strength of 4,090 lbs./in.² and an elongation of 600%.

*Example 2*

3,5-diethylphenol was prepared by the method described by Jannasch and Rathjen, Ber. 32, 2392 (1899). The dialcohol of this compound was then prepared by reacting 1 mol of the phenol with 4 mols of a 40% solution of formaldehyde in methanol. To this was slowly added 1 mol of a 57% KOH solution in water, while continually cooling the mixture. This mixture was allowed to stand for 18 hours at 25° C., by the end of which time crystals had separated. An analysis showed that 1.8 mols of formaldehyde had reacted. The crystals were filtered off. The filtrate was treated with sodium sulfite and neutralized. The resulting crystal precipitate after having been recrystallized from benzene had a melting point at 88° C. An analysis of this preparation showed a carbon content of 68.96% and a hydrogen content of 8.72%. The calculated theoretical values of 2,6-dimethylol-3,5-diethylphenol are 68.54% for carbon and 8.65% for hydrogen.

A 3,5-diethylphenol-formaldehyde resin was prepared by heating the dialcohol to 131° C. for 20 minutes. Water (110 mol percent) and a negligible amount of formaldehyde were lost, leaving a resin with a melting point of 70–75° C. (The molecular weight was not determined due to the insolubility of the compound in dioxane.)

Both the dialcohol and the resin of 3,5-diethylphenol were tested for their ability to vulcanize GRS 1601 type rubber, 10% by weight of each being milled into the rubber and the mixture cured for 1¼ hours at about 165° C. The dialcohol cured the rubber to a tensile strength of 3530 lbs./in.², with an elongation of 460%; the resin gave 3560 lbs./in.², tensile strength at 470% elongation. The dialcohol (5%) milled into the rubber with an equal weight of ZnO gave, after curing at 165° C. for 1½ hours, a tensile strength of 4540 lbs./in.² and 590% elongation.

*Example 3*

The method described by Carpenter (U.S. Patent No. 2,064,885) for propylating m-cresol to form 3-methyl-5-isopropylphenol was altered and adapted for the preparation of 3-methyl-5-sec-butylphenol. n-Butyl chloride was substituted for isopropylchloride of the Carpenter reaction. A slurry of 1.5 mols of anhydrous aluminum chloride in 450 gm. ethylene dichloride was prepared. One mol of m-cresol was added slowly at 25° C. to the slurry while stirring. Then 1.1 mols of n-butyl chloride was added at such a rate as to hold the cooled mixture at 30° C. The reaction product was then heated to 60° C. for 30 minutes, cooled, and poured slowly into 1500 gm. of ice. An organic layer was separated, washed four times with water, once with dilute hydrochloric acid and twice more with water. Ethylene dichloride was stripped off at 58–82° C. under atmospheric pressure, and a distillation at 3.5 mm. pressure yielded a major fraction at 99–130° C. Careful fractionation of this cut at 4 mm. yielded a colorless liquid boiling at 108.8–109° C. The carbon content of this liquid was 80.49% and hydrogen content 9.98% comparable to calculated values of 80.44% for C and 9.82% for H. This new phenol was reacted with 3,5-dinitrobenzoyl chloride to give a crystalline product melting at 102–102.5° C., and containing 60.76% carbon, 5.13% hydrogen and 7.99% nitrogen. The calculated values for 3-methyl-5-sec-butylphenyl-3,5-dinitrobenzoate are: carbon 60.33%, hydrogen 5.06%, and nitrogen 7.82%.

A resin was prepared from 3-methyl-5-sec-butylphenol by reacting 1 mol of phenol with 4 mols of formaldehyde (as a 40% methanolic solution) and 1 mol NaOH (as a 50% aqueous solution). After 120 hours at 43° C., analysis showed that 2 mols of formaldehyde had reacted. Dilution of the reaction mixture with water and acidification with acetic acid produced a resinous solid which was washed and dried. The product had a melting point of 65–70° C. and a molecular weight, determined cryoscopically in dioxane, of about 245. A resin of this molecular weight would consist mostly of the dimethylol phenol with some dinuclear compound present.

Five percent by weight of this resin of 3-methyl-5-sec-butylphenol was milled into GRS 1601-0 type rubber. A sample of this mixture, cured at about 165° C. for 1 hour showed a tensile strength of 1840 lbs./in.² and an elongation of 770%.

In general, phenols containing a methyl substituent in the 3-position, and a saturated alkyl substituent containing up to 30 carbons in the 5-position will form resols and may be used to form condensation products for the vulcanizing of artificial rubber according to the present invention. Some of the phenols from this group which may be used to form reaction products which are useful for vulcanizing artificial rubber according to the present invention are 3-methyl-5-n-propylphenol, 3-methyl-5-t-butylphenol, and 3-methyl-5-myricylphenol.

What is claimed is:

1. A method of vulcanizing a vulcanizable rubbery 1,3-butadiene polymer which comprises the steps of intimately admixing into the polymer a vulcanizing agent which is a resol and is a reaction product in the presence of an alkaline catalyst of at least 1.2 mols of formaldehyde per mol of phenol of the general formula:

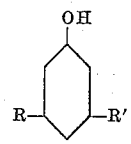

wherein R and R' are alkyl groups containing collectively a total of at least four carbon atoms and one of the alkyl groups is a methyl group when the remaining alkyl group contains at least three carbon atoms and is attached to the benzene ring by a carbon atom which is attached to a total of at least three carbon atoms including the carbon atom on the benzene ring, the resulting admixture containing a minor amount and not less than about 2% by weight of vulcanizing agent and subjecting the resulting mixture to an elevated vulcanizing temperature.

2. A method of vulcanizing a vulcanizable rubbery 1,3-butadiene polymer which comprises the steps of intimately admixing in the polymer a vulcanizing agent which is a resol and is a reaction product in the presence of an alkaline catalyst of at least 1.2 mols of formaldehyde per mol of phenol selected from the group consisting of 3,5-diethylphenol, 3-methyl-5-isopropylphenol, and 3-methyl-5-sec-butylphenol, the resulting admixture containing a minor amount and not less than about 2% by weight of vulcanizing agent and subjecting the resulting admixture to an elevated vulcanizing temperature.

3. A method of vulcanizing a vulcanizable rubbery 1,3-butadiene polymer which comprises the steps of intimately admixing in the polymer a vulcanizing agent which is a resol and is a reaction product in the presence of an alkaline catalyst of at least 1.2 mols of formaldehyde per mol of 3,5-diethylphenol, the resulting admixture containing a minor amount and not less than about 2% by weight of vulcanizing agent and subjecting the admixture to an elevated vulcanizing temperature.

4. A method of vulcanizing a vulcanizable rubbery 1,3-butadiene polymer which comprises the steps of intimately admixing in the polymer a vulcanizing agent which is a resol and is a reaction product in the presence of an alkaline catalyst of at least 1.2 mols of formaldehyde per mol of 3-methyl-5-isopropylphenol, the resulting admixture containing a minor amount and not less than about 2% by weight of vulcanizing agent and subjecting the admixture to an elevated vulcanizing temperature.

5. A method of vulcanizing a vulcanizable rubbery 1,3-butadiene polymer which comprises the steps of intimately admixing in the rubber a vulcanizing agent which is a resol and is a reaction product in the presence of an alkaline catalyst of at least 1.2 mols of formaldehyde per mol of 3-methyl-5-sec-butylphenol, the resulting admixture containing a minor amount and not less than about 2% by weight of vulcanizing agent and subjecting the admixture to an elevated vulcanizing temperature.

6. The vulcanized material produced by the method of claim 1.

7. The vulcanized material produced by the method of claim 2.

8. The vulcanized material produced by the method of claim 3.

9. The vulcanized material produced by the method of claim 4.

10. The vulcanized material produced by the method of claim 5.

References Cited in the file of this patent

UNITED STATES PATENTS

| | | |
|---|---|---|
| 2,165,380 | Honel | July 11, 1939 |
| 2,211,048 | Bitterich | Aug. 13, 1940 |
| 2,732,368 | Shepard | Jan. 24, 1956 |
| 2,813,843 | Shepard et al. | Nov. 19, 1957 |